March 10, 1970     E. PLUMAT     3,499,745
METHOD AND APPARATUS FOR MANUFACTURING SMALL
BEADS BY CENTRIFUGAL ACTION Filed Feb. 21, 1968     3 Sheets-Sheet 1

INVENTOR
EMILE PLUMAT

BY Toulmin & Toulmin

ATTORNEYS

March 10, 1970  E. PLUMAT  3,499,745
METHOD AND APPARATUS FOR MANUFACTURING SMALL
BEADS BY CENTRIFUGAL ACTION
Filed Feb. 21, 1968  3 Sheets-Sheet 2
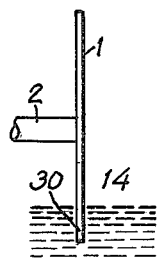
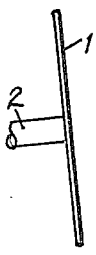
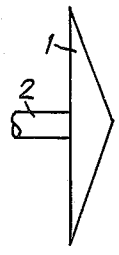
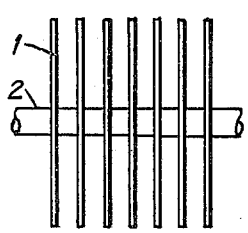
Fig.7   Fig.8   Fig.9   Fig.10
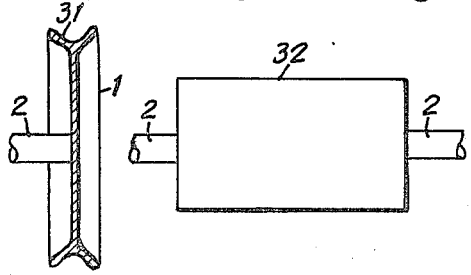
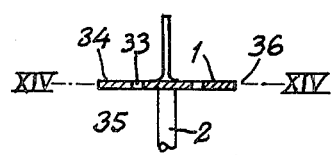
Fig.11   Fig.12   Fig.13
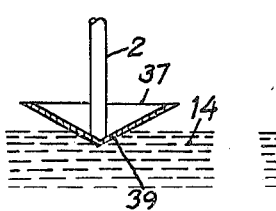
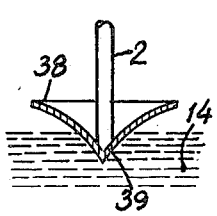
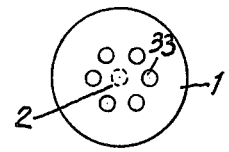
Fig.15   Fig.16   Fig.14
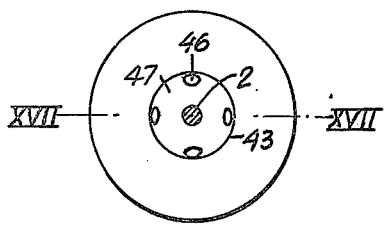
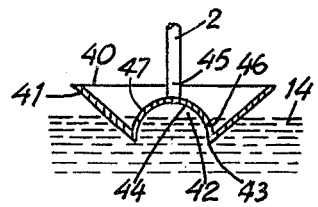
Fig.18   Fig.17
INVENTOR
EMILE PLUMAT
BY
Toulmin & Toulmin
ATTORNEYS INVENTOR
EMILE PLUMAT
BY
Toulmin & Toulmin
ATTORNEYS

United States Patent Office 3,499,745
Patented Mar. 10, 1970

3,499,745
METHOD AND APPARATUS FOR MANUFACTURING SMALL BEADS BY CENTRIFUGAL ACTION
Emile Plumat, Gilly, Belgium, assignor to Glaverbel, S.A., Watermael-Boitsfort, Belgium
Continuation-in-part of application Ser. No. 449,490, Apr. 20, 1965. This application Feb. 21, 1968, Ser. No. 711,152
Claims priority, application Luxembourg, Apr. 21, 1964, 45,921
Int. Cl. C03b *19/10*
U.S. Cl. 65—21   13 Claims

ABSTRACT OF THE DISCLOSURE

A method and apparatus for producing tiny spherical beads by applying molten glass to at least one surface of a rotating centrifugal member, permitting the molten glass to spread out in the form of a film, which flows outwardly under the influence of centrifugal force so as to be dispersed from the periphery of the member into tiny particles, and maintaining a hot zone containing at least that portion of the centrifugal member surface which is contacted by the material and a finite region through which the particles travel after dispersal, such that the hot zone is at a temperature sufficient to maintain this surface part and this region above the melting point of the material. Thus the glass is maintained at a temperature substantially above its melting point as it travels through space after being expelled from the member for permitting the particles to spherulize under the influence of surface tension. Also, it is possible to use material other than glasses.

CROSS-REFERENCE TO RELATED APPLICATION

This is a continuation-in-part of my copending U.S. application Ser. No. 449,490, now abandoned, filed on Apr. 20, 1965.

BACKGROUND OF THE INVENTION

The present invention relates to a method and apparatus for manufacturing small glass beads, the diameter of which is usually only a fraction of one millimeter. Such glass beads of extremely small size are being used, for example, for movie screens or reflecting paint.

There are several known processes for the manufacture of small glass beads in which grains of glass obtained by crushing and sorted by sifting are melted in suspension in hot gases or under the effect of surface heating, and assume spherical shape. Thereafter they are cooled. This manufacturing process is costly because of the wide variety of operations, double melting being costly as to fuel and fine crushing and sifting costly as to energy, equipment and maintenance. Moreover, the tendency of particles softened at high temperature to adhere to each other or to the walls of the apparatus results in a limitation of efficiency, the production capacity of the equipment and the quality of the product.

It has, on the other hand, been proposed that heated grains of glass should be melted in the presence of antiadherent powders in a rotary cylinder. These processes are uneconomical for the same reasons and require expensive powders, without which the small glass beads produced are blackened by inclusions.

It has further already been tried to avoid the grain-crushing, grain-sifting and second melting processes by dispersing a mass of molten glass directly into fine particles. The dispersion brought about by ultrasonic vibrations calls for complex equipment and is costly as to electrical energy. Dispersion of a thread of molten glass by the transverse action of hot gas jets is difficult and requires a great deal of fuel and compression energy. Division of a thread of glass falling onto an approximately horizontal surface under the effect of compressed-gas jets produces particles of large and irregular diameters. This is also the case when molten glass is pulverized by blowing gas below the surface of a glass bath. Finally, it has been proposed that small glass beads can be manufactured by introducing the molten glass into a receptacle revolving around its vertical shaft and having at the periphery capillary holes through which the molten glass is expelled drop by drop into a heated vessel. Here the difficulty consists in the construction of a hollow refractory having very fine orifices, in particular capillary holes. Maintenance of such a piece in good working condition during long periods of use is hardly practicable, and it is difficult to keep constant the diameter of the capillary orifices because of the erosion, corrosion, deformation and obstruction factors. Furthermore, production capacity is greatly limited by the practical dimensions of the piece, which is subjected to considerable centrifugal forces, and also on account of the very slight flow of each of the capillaries.

SUMMARY OF THE INVENTION

A general object of the present invention is to obviate the above and other shortcomings of the prior art methods.

A more specific object of the present invention is to produce small glass beads by applying a glass film onto a centrifugal piece from which molten glass particles are dispersed upon rotation by centrifugal force.

Another object of the present invention is to disperse molten glass particles into a hot zone where they assume spherical form.

Another object of the invention is to provide centrifugal pieces of various configurations so as to meet different production requirements.

An additional object of the invention is to provide apparatus for the practice of the improved method.

As will be explained in more detail below, while the present invention is particularly concerned with the treatment of glass, many of the novel features of the invention lend themselves particularly well to the treatment of other viscous materials and even the apparatus according to the invention could, in fact, satisfactorily operate on many materials of the type which are solid at certain temperatures and which become molten at more elevated temperatures.

By way of example, the invention can be applied to materials which are liquid (or even gaseous) at room temperature such as water. The treatment is then carried out within a much lower temperature range and the cooling of the particles may not take place at room temperature, but on the contrary in a cooled atmosphere at temperatures under the melting point of the material which undergoes the treatment.

When the invention is applied to materials whose viscosity is considerably beyond their melting temperature, if it is essential that the grains obtained have a perfect spherical shape, it is compulsory to use a hot zone having a sufficiently high temperature, so as to reduce the viscosity to about 100 poises; in another connection, if one does not place a too great value on the spherical shape, one may, in that case, use a hot zone where the viscosity is only reduced to about 350 poises, in order to avoid the production of fibers.

The term grains means here small quantities of material showing contracted shapes, i.e. whose sizes measured in three orthogonal directions are of the same order of growth.

When the materials to be treated have a viscosity which is always lying under 100 poises, beyond their melting point, one generally obtains spherical grains, whatever the temperature of the hot zone may be. Nevertheless, the said temperature must be sufficiently high, so as to avoid the premature solidification of the material occuring, for example, on the rotating piece.

These and other objects according to the invention are achieved by a method for manufacturing small grains of a material fusible by temperature elevation which includes the steps of applying molten material onto at least one surface of a rotating centrifugal piece, which surface is substantially perpendicular to the axis of rotation of the piece, so that the material spreads out in the form of a film which is maintained and progressively attenuated thereon, dispersing the film from the periphery of the piece by centrifugal force so that the film is divided into particles, and maintaining a hot zone containing at least that part of the centrifugal piece surface which is contacted by the material and a finite region through which the particles travel after dispersal the hot zone being at a temperature sufficient to maintain such surface part and such region above the melting point of the material.

The invention also includes an apparatus for manufacturing grains of a material which becomes liquid by temperature elevation, the apparatus including feeding means of such material in a molten state, a rotatable centrifugal piece having a continuous surface oriented substantially normally to the axis of rotation of the piece and arranged to receive molten material from the feeding means, the piece being arranged to rotate so as to spread the material out on the surface in the form of a film on at least one side thereof, the piece being substantially unobstructed at its periphery for permitting said film to be expelled itself from said periphery, a chamber enclosing at least the entire portion of the centrifugal piece with which the molten material comes in contact and also enclosing a finite region surrounding such periphery, from which piece, upon rotation thereof, particles are dispersed under the influence of the centrifugal force provided by the piece, and means for maintaining the interior of the chamber at a temperature which is above the melting point of the material of the particles. In certain cases, particularly when the chamber interior is well insulated from the exterior, the means for maintaining the chamber interior at the specified temperature could be constituted by the molten material itself.

According to a form of the invention, a film of molten glass is formed and dispersed by centrifugal force. More particularly, the glass film is formed by conveying the molten glass onto at least one surface of a rotating piece, and this film is dispersed into a hot zone and then into a cold zone, in such a way that in the hot zone, under the effect of the prevailing temperature, the dispersed particles of the molten glass can assume spherical form under the effect of the surface tension, and in the cold zone the small glass beads can solidify.

The process therefore comprises two phases. In the first phase, the mass of molten material is spread in the form of a film which thins out by covering an increasingly wide surface as it moves away from the center under the effect of the centrifugal force; the film is maintained on the surface of the revolving piece by wetting. In the second phase, the thin film leaves the periphery of the revolving piece and is dispersed by the high-speed rotation into the hot zone. The particles formed are made spherical in this zone if the viscosity is sufficiently low, then congealed in a cold zone at the extremity of which the trajectories of the grains finally lead to the receptacles for collecting the grains.

The present invention is particularly concerned with producing large quantities of particles having a high degree of sphericity in a relatively simple and efficient manner. The invention also seeks to accurately regulate the size of the resulting particles. It has been found that a prime requisite for the attainment of these objectives is that a proper control be effectuated on the viscosity of the molten material during the stage when it is in contact with the rotatable piece and during the stage when the resulting particles traverse the high temperature space surrounding the rotatable piece, in which space the particles assume spherical shape under the influence of surface tension.

The viscosity at which the material is maintained while traversing the high temperature space is particularly important when the molten material being treated is glass primarily because the molten glass particles can assume a spherical shape under the influence of surface tension only if their viscosity is maintained at a low value and because the viscosity of molten glass varies considerably with variations in its temperature.

It is primarily for these reasons that the concept of maintaining a high temperature region adjacent the rotatable piece offers the greatest benefits when glass is the material being treated.

Moreover, because the glass is being positively maintained in a low viscosity state while undergoing the sphering process, it is no longer necessary to initially heat the glass to an extremely high temperature before delivering it to the rotatable piece. If such were not the case, it would be necessary to initially heat the glass to such a high temperature that the materials used would really prove too expensive.

For many other materials having a much lower melting temperature, overheating beyond the melting point is not possible or is very detrimental, since the material undergoes a transformation such as oxidization, evaporation even boiling, or decomposition, for example the loss of single molecules such as $NH_3$, $SO_2$, $SO_3$, $CO_2$, as well as crystallization or constitution water. Even when such phenomena are not to be feared, it often proves more economical to maintain a hot zone, rather than to bring all the necessary heat by means of the material to be treated. One should also bear in mind that some materials which become rather little viscous immediately after the melting point so as to easily produce spherical particles, may not be treated at such temperatures, for they would progressively solidify in contact with the centrifugal piece, such solidification being more important when the melting temperature is higher, because then, the cold zone will more cool down the dispersion zone.

It has been found that in order for the molten particles to assume a spherical shape under the influence of surface tension while traversing the high temperature space, the particles must be maintained at a temperature which is sufficiently high to maintain them at, or bring them to, a viscosity of no more than 100 poises for a normal period of travel through the high temperature space. The molten particles could assume a spherical shape under the influence of surface tension even if their viscosity were as high as 200 poises, but this would require that the time of travel of the particles through the high temperature space be substantially increased with respect to the travel times normally available.

Thus, it will be appreciated that while the viscosity of glass is determined by its temperature, each variety of glass has a different temperature-viscosity characteristic and, as a general rule, it is the viscosity of glass which will determine its ability to sphere under the influence of surface tension. Therefore, it is more accurate to describe the state in which the glass particles must be placed in terms of their viscosity rather than in terms of their temperature.

However, in order to provide a better understanding of the present invention, several specific examples of types of glass which can be treated according to the invention and of the temperatures at which they must be maintained during treatment will be given below.

Ordinary window glass can only be treated at temperatures of the order of 1500° C. This has been found to be relatively difficult because the most usual and economical material does not hold up well at these temperatures.

Glass having a composition of 40% $SiO_2$, 15% $Al_2O_3$, 30% CaO and 15% MgO has a viscosity of 22 poises at 1300° C. and 59 poises at 1250° C.

Glass having a composition of 50% $SiO_2$, 10% $Al_2O_3$, 30% CaO and 10% MgO has a viscosity of 39 poises at 1300° C. and 75 poises at 1250° C.

Thus, these types of glass can be treated at any temperature greater than or equal to 1250° C. in such a way as to avoid all danger of their devitrification.

While the provision of a high temperature zone around the rotatable piece provides the greatest benefits when glass is being treated, the same benefits accrue, to a lesser degree, in the case of some other material which is viscous in a molten state but whose viscosity is lower.

In addition, it should be evident that the apparatus according to the invention could be used for the treatment of other materials which are not too viscous in a molten state in that their viscosity remain substantially constant over the entire range of liquid phase temperatures. Although such materials can be successfully treated in apparatus not provided with a high temperature zone simply by heating the materials to a sufficiently high temperature to assure that the resulting particles will remain molten during a portion of their free travel to a collecting zone, it has been found that even these materials can derive certain benefits from the apparatus according to the invention. This is primarily true because the provision of a high temperature zone in which particles of such materials could assume spherical shape after expulsion from a rotatable piece permits the material to be initially heated to a lower temperature above its melting point inasmuch as the material will be maintained in a molten state by the high temperature zone. Since, in the absence of such a high temperature zone, the material would otherwise have to be heated to a temperature substantially above its melting point, particularly because the material dissipates heat at an extremely high rate after having been broken up into particles, it might be necessary to initially heat the material to such a high temperature that it would be in danger of decomposing or of being otherwise undesirably affected.

material to spread out in the form of a film. One effect of lowering the temperature of the material during the time when it is in contact with the rotatable piece is that the size of the resulting particles will be increased as a result of the increase in the viscosity of the material at the time of its expulsion from the piece. Thus, a different temperature in the region occupied by the rotatable piece permits greater flexibility in controlling the size of the resulting spherical particles.

As a general rule, the size of the resulting particles will decrease as the rate of rotation and/or diameter of the rotatable piece is increased and as the surfaced tension, viscosity and/or flow rate of the material to be treated is reduced.

Among thermoplastic material which could be treated according to the invention, it is possible to cite: polystyrene having a molecular weight of 50,000 to 100,000 and a viscosity of 100 poises at a suitable treatment temperature of 217° C.; and polyethylene having a molecular weight of less than 80,000 and a viscosity of less than 100 poises at a suitable treatment temperature of 140° C.

The apparatus according to the invention could also be used for treating the following non-thermoplastic materials:

Ammonium polyphosphates which could be treated according to one of the two following non-limitative examples:

|  | Example I | Example II |
|---|---|---|
| Hot chamber: |  |  |
| Diameter, mm | 500 | 500 |
| Temperature, ° C | 170 | 170 |
| Disc: |  |  |
| Diameter, mm | 200 | 400 |
| Velocity, r.p.m | 200 | 1,200 |
| Beads: |  |  |
| Average diameter | 3 mm. | 700μ |
| Production rate, kg./hour | 300 | 300 |

Ammonium nitrate having a melting temperature of between 160 and 260° C.; and

Calcium metaphosphate having a specific gravity of 2.82 at a melting temperature of 975° C.

Several other specific examples are presented in the following table.

TABLE

| Nature of Material | Properties of the material | | | | Centrifugation Conditions | | | |
|---|---|---|---|---|---|---|---|---|
| | Material Flow Rate, kg/hr. | Surface Tension, dynes/cm. | Viscosity, poises | Specific Gravity | Disc Diameter, mm. | Disc Velocity, r.p.m. | Average Diameter of Beads, μ | Hot Zone Temperature, ° C. |
| $Na_3PO_4$ | 50 | 100 | 10 at 100 °C | 1.62 | 250 | 1,500 | 400 | |
| | 550 | | | | 250 | 3,500 | 200 | 95 |
| | 2,000 | | | | 600 | 3,500 | 600 | |
| Sulfur | 550 | 40 at 445° C | 7.03 at 150° C | Solid=2.07 Liquid=1.8 | 250 | 3,500 | 130 | 150 |
| NaCl | 550 | 114 at 803° C | 1.01 at 841° C | 2.165 | 250 | 3,500 | 80 | 850 |
| $NaNO_3$ | 550 | 120 at 322° C | 2.5 at 320° C | 2.26 | 250 | 3,500 | 140 | 400 |
| Glass: | | | | | | | | |
| (1) | 550 | 350 | 59 at 1,250° C | | 250 | 3,500 | 280 | 1,250 |
| (2) | 550 | 350 | 75 at 1,250° C | | 250 | 3,500 | 290 | 1,250 |

Glass composition, percent:
(1) $SiO_2$, 40; $Al_2O_3$, 15; CaO, 30; MgO, 15.
(2) $SiO_2$, 50; $Al_2O_3$, 10; CaO, 30; MgO, 10.

Insofar as concerns the conditions existing in the region occupied by the portions of the rotatable piece with which the molten material comes in contact, this region could be maintained at the same temperature as the space surrounding the rotatable piece, or at a somewhat lower temperature. This is true primarily because, although the viscosity of the glass or other thermoplastic material must be maintained below a certain value in order for the particles to sphere, the spreading out of the material and its division into particles upon expulsion from the rotatable piece could be accomplished at a lower temperature, which must still be well above the melting point of the material. The temperature at which the material is maintained while in contact with the rotatable piece must also be sufficiently high to enable the The process of the invention has numerous advantages which result from its simplicity and flexibility. The operation is non-recurrent, rapid and inexpensive, the expenses involved in crushing, sifting, handling and second melting being avoided. Electrical energy consumption is low, since the glass slides onto the surface. The centrifugal speed may be adjusted as desired by modifying the diameter of the revolving piece or by varying its rotation speed. Regulation of the glass flow and the circumferential speed allows the diameter and production of the small glass beads to be adjusted. Good results are obtained under different conditions. It is thus possible to produce small glass beads in a wide range of diameters and it is particularly easy to produce very small glass beads. For each operation, the diameters of the small glass beads are satisfactorily uniform and the spherical shape is perfect. As dispersion of the molten glass takes place in an expanding gaseous medium, the risk that the small glass beads stick to each other is obviated and adherence to the walls is practically avoided as a result of concentration of the trajectories. The high speed of rotation used, together with the fact that large-sized revolving pieces can be employed, results in high productivity.

It is beneficial to heat the gaseous medium of the zone into which the film is dispersed and in which the particles are made spherical. This serves to produce small glass beads of better quality by improving their sphericity, and it is possible to reduce the time of flight of the particles in the hot zone and hence to reduce their dimensions. Even so, fuel consumption may be kept low because heat losses are reduced and the glass employed does not have to be heated again but only maintained at a high temperature. It is preferred to maintain the heat in the zone in which the spheres are formed by protecting this zone with a refractory wall. Separation and heat-insulation of the high-temperature zone have the advantage of minimizing the heat losses and also of reducing the temperature gradients which thus ensures considerable uniformity of working conditions and consequently guarantees the quality of the products with the use of fewer resources. If the high temperature zone is sufficiently well insulated from the surrounding environment, the heat given off by the molten material in this zone will often be sufficient to maintain the zone at the selected temperature above the melting point of the material.

It has been pointed out that it is advisable to use molten glass of very low viscosity. This may be obtained by increasing the temperature. In this case, the diameter of the small glass beads decreases and the flow can be increased. Ordinary sodocalcic glass can therefore be used successfully. If, on the other hand, low-viscosity special-composition glass is employed, the same advantages can be obtained without raising the temperature or combining the two effects.

According to the invention, the glass film is formed on at least one surface of a piece revolving around an approximately vertical shaft, or revolving around a horizontal shaft, or, revolving around an inclined shaft. The molten glass may be conveyed onto the rotating piece in one or more casts, or onto one of the surfaces of this piece, or simultaneously onto several surfaces, for example, onto both the surfaces of a rotating disc. When only one glass cast is used, it comes into contact with the piece at the center of rotation, but it may also be directed to a peripheral part of the rotating piece, as is normally the case when several casts are made.

The glass cast or casts are normally directed downward, as it is very easy to adjust the point of impact in this way, but the glass film may also be applied by a cast assuming the form of an oblique or horizontal jet and even a pressurized jet directed upward, for example, in order to cover the lower surface of the revolving piece. The advantages of cast-feeding lie in the ease and stability of the feeding process, and also in the ease with which the glass flow can be regulated.

When the molten glass is made to flow onto the upper surface of a piece revolving around a vertical shaft, the glass on the revolving piece is stabilized by gravity. Moreover, the trajectories of the small glass beads are initially near-horizontal and subsequently uniformly influenced by gravity. In this case, it is advisable to direct the glass cast to the center of rotation of the revolving piece, on the latter's upper surface. Thus the film is spread over the entire surface of the piece and is dispersed in particles throughout the entire periphery. Production is thus maximal for a given revolving piece. By directing the cast eccentrically onto the revolving piece, dispersion takes place in a preferential direction. This limitation of the range of dispersion makes it possible to reduce the amount of space required by the cold zone, to the detriment, however, of the production of the device and the small glass beads' dimensional uniformity, as the glass film formed on the surface of the revolving piece assumes a variable thickness at the latter's edge.

If the molten glass is made to flow onto the surface of a piece revolving around an at least approximately horizontal axis, it is then possible to utilize the action of the gravity to accelerate or slow down the particles in their trajectories.

In other forms of execution of the invention, the rotating piece is partially immersed in the molten glass. The glass which adheres to the piece is then entrained and centrifuged on the surface of the piece along which it emerges from the bath in an upward direction. The fact that the rotating piece and the chamber surrounding it are in the vicinity of the surface of the high-temperature bath constitutes an important advantage, as in this way, it is possible to reduce or dispense entirely with the heating of this chamber because of the heat-feed provided by the glass from the melting and refining furnace. Thus it is advantageous to immerse in the glass bath a portion of the periphery of a piece revolving around a horizontal shaft, or even around an inclined shaft. If the revolving piece is shaped like a disc of a certain thickness, a molten glass film may be formed on both the surfaces of this disc. Moreover, the piece is protected against corrosion by the ambient hot gases.

The glass film can also be formed by immersing in the glass bath a projecting central part of a rotating piece, which may, for instance, be conical, and which revolves preferentially around a vertical shaft. This form of execution combines the advantages of immersion-feeding and the vertical shaft.

After being shaped in the high-temperature zone and cooled in the lower-temperature zone, the small glass beads are sorted preferentially according to their diameter, using different collecting receptacles at the end of their trajectories. It has, in fact been observed that the higher-diameter particles have longer trajectories, whereas the small particles, which are slowed down to a greater extent, fall nearer their starting point. Thus the expense involved in subsequent classification is limited or avoided altogether.

A device for manufacturing small glass beads by the process described above consists mainly in a hot vessel adjacent a cold zone, and a centrifugal piece, the periphery of which makes it possible for the molten glass to spread in a film over at least one of this piece's surfaces to leave the piece freely and disperse. According to the embodiment chosen, this device further includes a molten-glass receptacle fitted with a casting mechanism directed to the centrifugal piece or a molten-glass receptacle in which the centrifugal piece is partially immerged.

The hot vessel is advantageously delimited by a heat-insulating screen designed to reduce heat losses, with a view to limiting and, if appropriate, reducing the heating in the hot zone.

In order to enable the glass spread in a film over the centrifugal piece to leave the latter freely and disperse in the hot vessel, the edge of the centrifugal piece must have no obstacle preventing the egress of the molten glass. In many cases, the edge of the centrifugal piece thus constitutes a continuous circular line whereas in other cases it may be toothed. The centrifugal piece may advantageously be shaped like a tray or like a bowl, the periphery of which may be provided on at least one of the piece's surfaces with an oblique, straight or concave edge, widening outward. In another form of execution, the edge of the tray forming the centrifugal piece has a peripheric groove, which offers the advantage of being able to use both the piece's surfaces for dispersion of the glass films spread over them without the glass particles' being able to meet in space. The centrifugal piece may assume still other forms than that of a tray or a bowl, and in particular may have a cylindrical perimeter. In this case, the piece revolves advantageously around a horizontal shaft and is partially immersed in the molten-glass bath. If it is desired to obtain small glass beads of different diameters—which is usually not the case—the centrifuging piece may be set up on an inclined shaft.

The centrifugal piece is advantageously of a refractory ceramic material which efficiently withstands erosion and corrosion by the molten glass and also withstands the hot gases. However, construction of centrifugal pieces of large diameter, and also the use of high speeds, calls for the utilization of cermets and metals, more particularly refractory metals, such as molybdenum and tungsten. In the case of a centrifugal disc in one of these metals, practically no wear was observed in the surfaces in contact with the molten glass. In the same connection, the centrifugal piece may also be perforated for the purpose of allowing the reverse surface to be penetrated by part of the molten glass which has been conveyed onto the surface constituting the right side of the piece, or the reverse surface may be maintained in contact with a gas adequate to the purpose of protecting it against oxidation.

In the cold zone, the device includes several receptacles designed to take the congealed small glass beads, which accumulate in them according to their dimensions.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIGURES 7 to 12 show various forms of a centrifugal piece with a horizontal or inclined shaft.

FIGURES 13 and 14 represent a centrifugal piece in the form of a disc with perforations.

FIGURES 15 to 18 are sections of vertical-axis centrifugal pieces partially immersed in a molten-glass bath.

DESCRIPTION OF THE PREFERRED EMBODIMENTS

Figure 1:
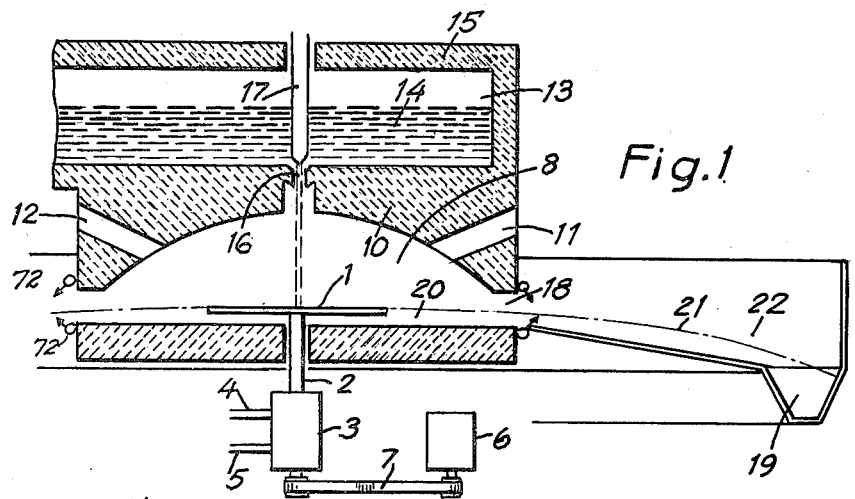
FIGURE 1 is a vertical section of a complete device in which the centrifugal piece is fed from above.
Figure 2:
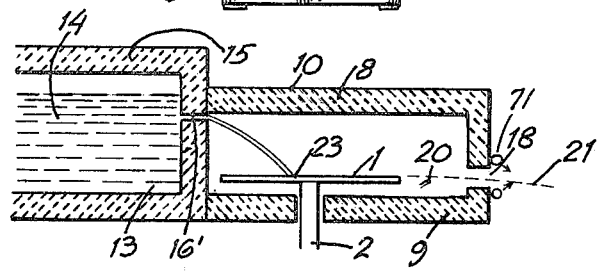
FIGURE 2 represents diagrammatically a modification in which feeding of the centrifugal piece is by oblique casting.

The device includes a centrifugal piece 1, which in FIGURES 1 and 2 is disc-shaped and set in a hollow shaft 2 which can be cooled by water. This shaft is guided by a bearing system 3 which has a water-inlet tube 4 and outlet tube 5. The shaft is actuated by a motor 6 by means of a belt 7. The disc constituting the centrifugal piece is in a refractory chamber 8 (hot zone) formed by a bedplate 9 and a vault 10. The latter has orifices 11 and 12, in which are placed burners fed with air and combustible gas. The vault also acts as a bottom for the tip of a basin 13 containing molten glass 14 and being sealed by refractory sheathing 15. In addition, the vault 10 has drilled in it an orifice 16 with a flow that can be controlled by means of a center-punch, the position of which is fixed by a known device not shown.

In FIGURE 1, the molten glass flows from the basin 13 onto the center of the disc 1 in a thread which passes through the orifice 16 and the flow of which is controlled by moving the center-punch 17. The rotation of the disc 1 forces the glass adhering to it to spread out in a film, which stretches and becomes thinner under the effect of the centrifugal force and then disperses in particles after having left the periphery of the disc. The surface tension has the effect of making these particles spherical as they pass into the peripheral zone 20 of the chamber 8, this being due to the high temperature there resulting from the heat-insulation of the chamber and from the heat fed in by the burners provided in the orifices 11 and 12. Pursuing their trajectories 21, the glass particles leave the chamber through the slit 18 and are rapidly cooled by the air of the outer zone 22. They finally come to rest in the bottom of the channel 19, where they are collected and removed by means not shown.

Whereas in FIGURE 1 the centrifugal piece 1 is fed by a vertical glass cast which makes contact with it at the center, in FIGURE 2 the molten glass arrives in an oblique cast from the basin 13 through a lateral orifice 16' and makes contact with the piece at an eccentric point 23. Dispersion is accordingly in a preferential direction and the channel 19 need only extend over a part of the circumference of the chamber 8.

It has been found that the effectiveness of the treatment process according to the present invention can be increased if gases are prevented from flowing from the region surrounding the chamber 8 to the interior thereof. If such flow of gas is eliminated, or at least substantially reduced, the desired temperature can be more easily maintained within the chamber and contamination of any special treatment gases which it might be desired to employ can be prevented.

Such an inflow of undesired gas to the chamber 8 can be prevented, according to the present invention, by disposing a conduit 71 having a plurality of gas jet openings around the output slit 18 of the chamber 8 of FIGURE 2. The conduit 71 is arranged to provide a screen of gas streams which flow in the directions illustrated by the arrows in FIGURE 2 and which serve to prevent the passage of gases from the region surrounding chamber 8 into the output slit 18 thereof. The gas streams making up this protective screen act more or less symmetrically on the particles emerging from chamber 8 and hence will have substantially no influence on their trajectories.

Another embodiment of the air screen producing arrangement is shown in FIGURE 1 to include two annular conduits 72 each disposed to a respective side of the annular slit 18 of the chamber shown therein. Each conduit produces a plurality of air streams whose directions are indicated by the arrows and the air streams produced by the two conduits cooperate to form a protective screen which acts symmetrically on the trajectories of the spherical particles emerging from the chamber.

Figure 3:
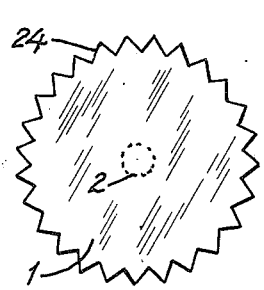
FIGURES 3 to 6 show four forms of execution of a centrifugal piece set in a vertical shaft.
Figure 4:
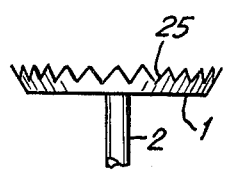
Figure 6:
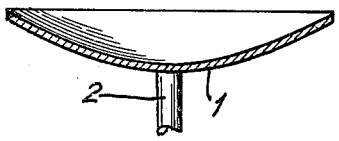
Figure 5:
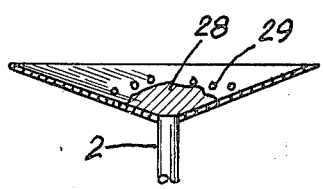

The disc according to FIGURE 3 has in its plan teeth 24 set in regular order around its periphery, and the disc according to FIGURE 4 has teeth 25 arranged obliquely. The film of molten glass leaves the disc at the tips of the teeth and disperses in particles of a diameter appreciably larger than on a disc with a continuous circular edge (FIGURE 1). The centrifugal pieces as shown in FIGURES 5 and 6 are in the shape of a cone and a spherical hood respectively, being of molybdenum plating. Water-cooling of the hollow shaft 2 may create a hummock 28 (FIGURE 5) of glass of a viscosity too great to be entrained by centrifuging. Thus particles 29 sometimes escape prematurely before reaching the periphery of the piece, and as they do not move at the same speed and possibly do not have the same temperature as the particles leaving the periphery, they result in spheres of inadequate diameter or in shapeless masses which both constitute waste. This defect may be prevented by means of centrifugal pieces having concave shapes, for example, those of cones or hoods, because the particles 29 end up on the surface of the piece instead of being directly projected.

When the centrifugal piece is set on a horizontal or inclined shaft (FIGURES 7 to 12), the molten-glass film may be formed by one or more eccentric lateral castings onto one or both of the piece's surfaces, or the lower part 30 (FIGURE 7) may be immersed in a molten-glass bath. When oblique casting is employed, formation of the film may be facilitated by an inclined shaft (FIGURE 8). The same result is, however, achieved more easily by shaping the centrifugal piece like a cone (FIGURE 9) revolving on a horizontal shaft. When the film is formed by partial immersion of the centrifugal piece in a molten-glass bath, the productivity of the device may be increased by setting in the same shaft 2 several discs 1 (FIGURE 10), or by giving the disc 1 a rim 31 (FIGURE 11), or by shaping the centrifugal piece like a cylinder 32, made of a refractory material (FIGURE 12).

The centrifugal pieces may further be given perforations 33 (FIGURES 13 and 14) connecting the two opposite surfaces. In this way, the molten glass feeding a surface 34 reaches the other surface 35 through the perforations 33 and protects the latter surface against oxidation by the hot gases, which is particularly advantageous in the case of metals such as molybdenum, which are not affected by the molten glass but oxidize in the hot air. The films formed on these two surfaces may be prevented from meeting at the periphery, e.g., by giving this periphery a groove 36. When preference is accorded to a centrifugal piece which becomes partially immersed in a molten-glass bath but revolves on a vertical shaft, it is made conical 37 (FIGURE 15) or given some similar shape 38 (FIGURE 16), the central point 39 being immersed in the glass 14. In a form of execution which makes it possible to form a molten-glass film on both surfaces, the piece 40 (FIGURE 17) includes a blunted cone 41, the small base of which is in the lower part and has a cavity 42. The circumference 43 of this small base is immersed in the molten glass, whereas the top 44 of the cavity remains above the level of the glass and so limits the heating of the shaft-end 45. Holes 46, made in the wall 47 of the cavity, connect the two surfaces of the piece, as is also shown by FIGURE 18, which is a plan view of the piece 40 shown in FIGURE 17.

When the centrifugal pieces shown in FIGURES 15 to 18 are rotated, the molten glass is rotationally entrained and, through the action of centrifugal force, moves away from the shaft and up the surface of the piece until it reaches the periphery, where it disperses in particles.

Figure 19:
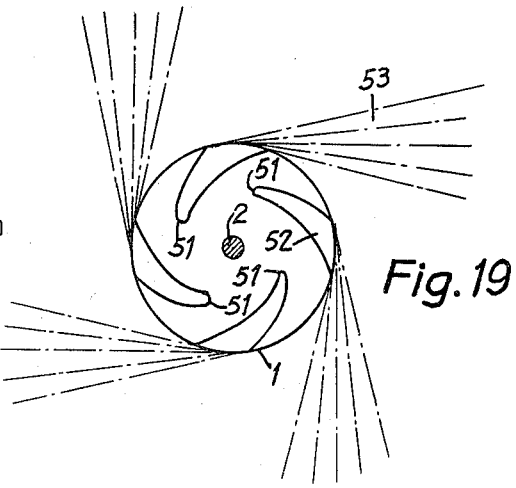
FIGURE 19 is a plan view of a disc fed by several eccentric castings.

FIGURE 19 shows a special way of cast-feeding a disc revolving around a vertical shaft. The casting jets, of which there are four here, end up at the points 51 positioned between the disc shaft and the periphery. The molten glass spreads out in 52, reaching the circumference of the disc, from which the film disperses in particles forming four beams of relatively concentrated trajectories 53.

Figure 20:
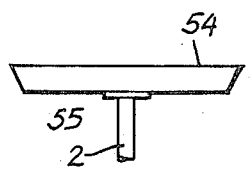
FIGURES 20 and 21 show discs of different materials.
Figure 21:
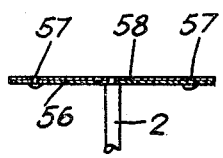

The details of construction shown in FIGURE 20 are a disc 54, of a refractory ceramic material, fixed onto the shaft 2 by means of a metal disc 55, and in FIGURE 21 a disc 56, of refractory steel, onto which is fixed by rivets 57 a disc 58, consisting of a molybdenum plate, in order to protect the latter against the oxidizing gases.

Figure 22:
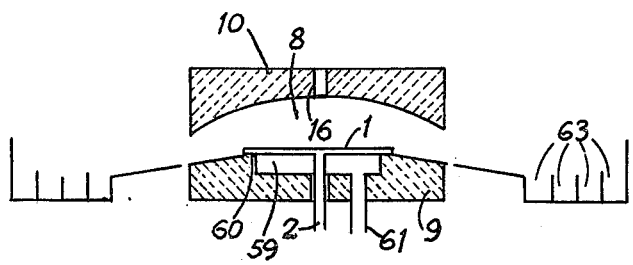
FIGURE 22 shows a section of an embodiment in which the centrifugal piece is protected on the lower surface by a neutral or anti-oxidizing gas.

It is also possible to protect the lower surface of a molybdenum disc revolving in a chamber 8 formed by a bedplate 9 and a vault 10 by inserting a chamber 59 between the disc and the bedplate (FIGURE 22). The peripheral space 60 has as limited a clearance as possible, and through the tube 61 a neutral or reducing gas is injected into this chamber. Around the chamber 8 there are several circular channels 63, which collect the small glass beads of different diameter ranges, the largest beads having the longest trajectories.

Figure 23:
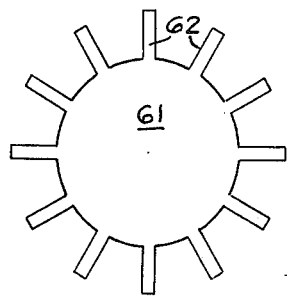
FIGURE 23 is a plan view of another form of disc according to the invention.
Figure 24:
FIGURE 24 is an elevational, cross-sectional view of the disc shown in FIGURE 23.

FIGURES 23 and 24 are plan and cross-sectional, elevational views, respectively, of another form of construction for the disc according to the present invention. In this embodiment, there is provided a disc having an essentially circular portion 61 to which the molten material is delivered and a plurality of radial arms 62 extending from the portion 61. The outer ends of the arms 61 define the effective periphery of the disc. Molten material delivered onto the essentially circular portion 61 spreads out in the form of a film which flows outwardly toward the arms 62. Upon reaching the arms, the film is divided among them and each resulting film portion flows outwardly along its associated arm. When each film portion reaches the outer end of its associated arm, it is dispersed in the form of small particles. It has been found that the provision of such radial arms 62 permits a greater size uniformity to be given to the resulting particles.

It will be understood that this invention is susceptible to modification in order to adapt it to different usages and conditions.

What is claimed is:

1. A method for manufacturing grains of a material fusible by rise of temperature comprising the steps of: applying molten material onto at least one surface of a rotating centrifugal piece, which surface is substantially perpendicular to the axis of rotation of said piece, so that the material spreads out in the form of a film which is maintained and is progressively attenuated thereon; dispersing the film from the periphery of the piece by centrifugal force so that the film is divided into particles; and maintaining a hot zone containing at least that part of the centrifugal piece surface which is contacted by the material and a finite region through which the particles travel after dispersal, the hot zone being at a temperature sufficient to maintain such surface part and such region above the melting point of the material.

2. A method as defined in claim 1 wherein the molten material is applied from above and is conveyed onto both surfaces of the rotating centrifugal piece.

3. A method as defined in claim 1 wherein molten material is delivered onto only one surface of the rotating centrifugal piece and the opposite surface of the piece is maintained in contact with a gas for protecting such other side against oxidation by hot gases.

4. A method as defined in claim 1 wherein the molten material is applied from above and the centrifugal piece is arranged for rotation about an inclined shaft so as to expel material in a direction which is inclined with respect to both the horizontal and the vertical.

5. A method as defined in claim 1 wherein the molten glass is applied by dipping a portion of the centrifugal piece into a mass of the molten material.

6. A method as defined in claim 1, in which the part of the hot zone which is crossed by the particles after expelling from the centrifugal piece, is maintained at a temperature at which the material has a relatively low viscosity, so as to enable the particles to assume a spherical shape.

7. A method as defined in claim 6, in which the said part of the hot zone is maintained at a temperature at which the material has a viscosity of about 100 poises maximum.

8. An apparatus for manufacturing grains of a material which becomes liquid by rise of temperature, comprising in combination: feeding means for such a material in the molten state; a rotatable centrifugal piece having a continuous surface oriented substantially normally to the axis of rotation of said piece and arranged to receive molten material from said means, said piece being arranged to rotate so as to spread the material out on said surface in the form of a film on at least one side thereof, said piece being substantially unobstructed at its periphery for permitting said film to be expelled itself from said periphery; a chamber enclosing at least the entire portion of said piece with which the molten material comes in contact and also enclosing a finite region surrounding said periphery, from which piece, upon rotation thereof, particles are dispersed under the influence of the centrifugal force provided by said piece; and means for maintaining the interior of said chamber at a temperature which is above the melting point of the material of the particles.

9. An arrangement as defined in claim 8 further comprising means supporting said centrifugal piece so that a portion thereof dips into a basin containing a molten mass.

10. An arrangement as defined in claim 8 wherein said centrifugal piece has two sides and a peripheral groove between said two sides and is arranged to have both said sides receive molten material from feeding means and to cause the material to spread out in the form of a thin film on each said side.

11. An arrangement as defined in claim 8 further comprising means defining a cold zone adjacent said chamber, the interior of said chamber being thermally protected from said cold zone, and at least one receptacle for receiving the resulting particles after their solidification in said cold zone, wherein said chamber is provided with a lateral opening for the passage of particles from the interior thereof to said cold zone, said arrangement further comprising conduit means surrounding said lateral opening for producing a protective curtain of blown gas for preventing the passage of gas from said cold zone to the interior of said chamber.

12. An arrangement as defined in claim 8 wherein said means for maintaining, in the part of the hot zone where the particles are expelled, maintain a temperature at which their material has a relatively low viscosity, in such a way that the particles will assume a spherical shape.

13. An arrangement as defined in claim 12, in which the said means for maintaining in the said part of the hot zone, maintain a temperature at which the material has a viscosity of about 100 poises maximum.

References Cited

UNITED STATES PATENTS

| | | | |
|---|---|---|---|
| 2,306,449 | 12/1942 | Landgraf | 264—8 |
| 2,358,068 | 9/1944 | Hiller | 264—8 |
| 2,439,772 | 4/1948 | Gow | 264—8 |
| 3,054,139 | 9/1962 | Bartholomew et al. | 65—21 |
| 3,248,197 | 4/1966 | Michalik et al. | 65—32 |
| 3,282,066 | 11/1966 | Searight | 65—141 |
| 3,310,391 | 3/1967 | Law | 65—21 |
| 2,713,534 | 7/1955 | Constant. | |
| 3,325,263 | 6/1967 | Day et al. | 65—141 |
| 3,400,189 | 9/1968 | Nacke | 264—8 |

S. LEON BASHORE, Primary Examiner

E. R. FREEDMAN, Assistant Examiner

U.S. Cl. X.R.

65—142; 71—64; 264—8, 15